(12) United States Patent
Parke et al.

(10) Patent No.: US 9,395,385 B2
(45) Date of Patent: *Jul. 19, 2016

(54) METHOD AND APPARATUS FOR DETERMINING A RELATIVE ORIENTATION OF POINTS ON A RIGID BODY

(71) Applicant: PPG Technologies, Inc., Winnipeg (CA)

(72) Inventors: Gordon Parke, Winnipeg (CA); Adam Tsouras, Winnipeg (CA); Eytan Moudahi, Pickering (CA)

(73) Assignee: PPG TECHNOLOGIES, INC., Winnipeg (CA)

( * ) Notice: Subject to any disclaimer, the term of this patent is extended or adjusted under 35 U.S.C. 154(b) by 0 days.

This patent is subject to a terminal disclaimer.

(21) Appl. No.: 14/560,055

(22) Filed: Dec. 4, 2014

(65) Prior Publication Data

US 2015/0107358 A1    Apr. 23, 2015

Related U.S. Application Data

(63) Continuation of application No. 13/744,294, filed on Jan. 17, 2013, now Pat. No. 8,905,856.

(51) Int. Cl.
*A63B 69/36* (2006.01)
*G01P 15/08* (2006.01)
*G01C 21/16* (2006.01)
(Continued)

(52) U.S. Cl.
CPC ............ *G01P 15/0888* (2013.01); *G01C 21/16* (2013.01); *G01C 25/005* (2013.01); *G01P 15/18* (2013.01)

(58) Field of Classification Search
USPC ............................................ 473/223; 700/91
See application file for complete search history.

(56) References Cited

U.S. PATENT DOCUMENTS

| 5,342,054 A | 8/1994 | Chang et al. |
| 6,033,370 A | 3/2000 | Reinbold et al. |
| 7,219,033 B2 | 5/2007 | Kolen |

(Continued)

FOREIGN PATENT DOCUMENTS

| CA | 2 560 023 | 10/2005 |
| CA | 2 595 793 | 8/2006 |
| WO | WO 2011/028357 A1 | 3/2011 |

OTHER PUBLICATIONS

"I got my Swingbyte! What do I do?: Swingbyte", https://swingbyte.zendesk.com/entries/21433803-i-got-my-swingbyte-what-do-i-do.

(Continued)

*Primary Examiner* — Masud Ahmed
(74) *Attorney, Agent, or Firm* — Oblon, McClelland, Maier & Neustadt, L.L.P.

(57) ABSTRACT

An inertial measurement unit is affixed to a rigid body. The inertial measurement includes a gyroscope that measures a first angular velocity and an angular acceleration; a first accelerometer that measures a first acceleration; a communications unit that receives a measurement signal, the measurement signal including a second acceleration transmitted from a second accelerometer, the second accelerometer being affixed to the rigid body; and a controller that calculates a relative orientation of the inertial measurement unit and the second accelerometer, and a distance separating the inertial measurement unit and the second accelerometer.

30 Claims, 12 Drawing Sheets

(51) Int. Cl.
*G01C 25/00* (2006.01)
*G01P 15/18* (2013.01)

(56) References Cited

U.S. PATENT DOCUMENTS

| | | |
|---|---|---|
| 7,736,242 B2 | 6/2010 | Stites et al. |
| 8,257,191 B2 | 9/2012 | Stites et al. |
| 8,409,025 B2 | 4/2013 | Stites et al. |
| 8,414,411 B2 | 4/2013 | Stites et al. |
| 8,500,570 B2 | 8/2013 | Stites et al. |
| 2005/0054457 A1 | 3/2005 | Eyestone et al. |
| 2005/0215340 A1 | 9/2005 | Stites et al. |
| 2007/0135225 A1 | 6/2007 | Nieminen et al. |
| 2010/0216563 A1 | 8/2010 | Stites et al. |
| 2010/0216565 A1 | 8/2010 | Stites et al. |
| 2011/0053698 A1 | 3/2011 | Stites et al. |
| 2011/0224012 A1 | 9/2011 | Hashimoto et al. |
| 2012/0329568 A1 | 12/2012 | Stites et al. |
| 2013/0303295 A1 | 11/2013 | Stites et al. |

OTHER PUBLICATIONS

"Mobile golf swing analysis on your phone or tablet I Swingbyte", http://www.swingbyte.com/how_it_works.

US Office Action issued in U.S. Appl. No. 13/005,163, filed Jan. 12, 2011.

International Search Report and Written Opinion issued Mar. 7, 2014 in PCT/CA2014/000035 filed on Jan. 17, 2014.

Jared B. Bancroft, "Multiple Inertial Measurement Unit Integration for Pedestrian Navigation", Department of Geomatics Engineering, UCGE Reports, No. 20320, Dec. 2010, 196 pages URL:http://www.geomatics.ucalgary.ca/graduatetheses.

Javier Almazán, et al. "Full auto-calibration of a smartphone on board a vehicle using IMU and GPS embedded sensors", 2013 IEEE Intelligent Vehicle Symposium (IV), Jun. 2013, pp. 1374-1380.

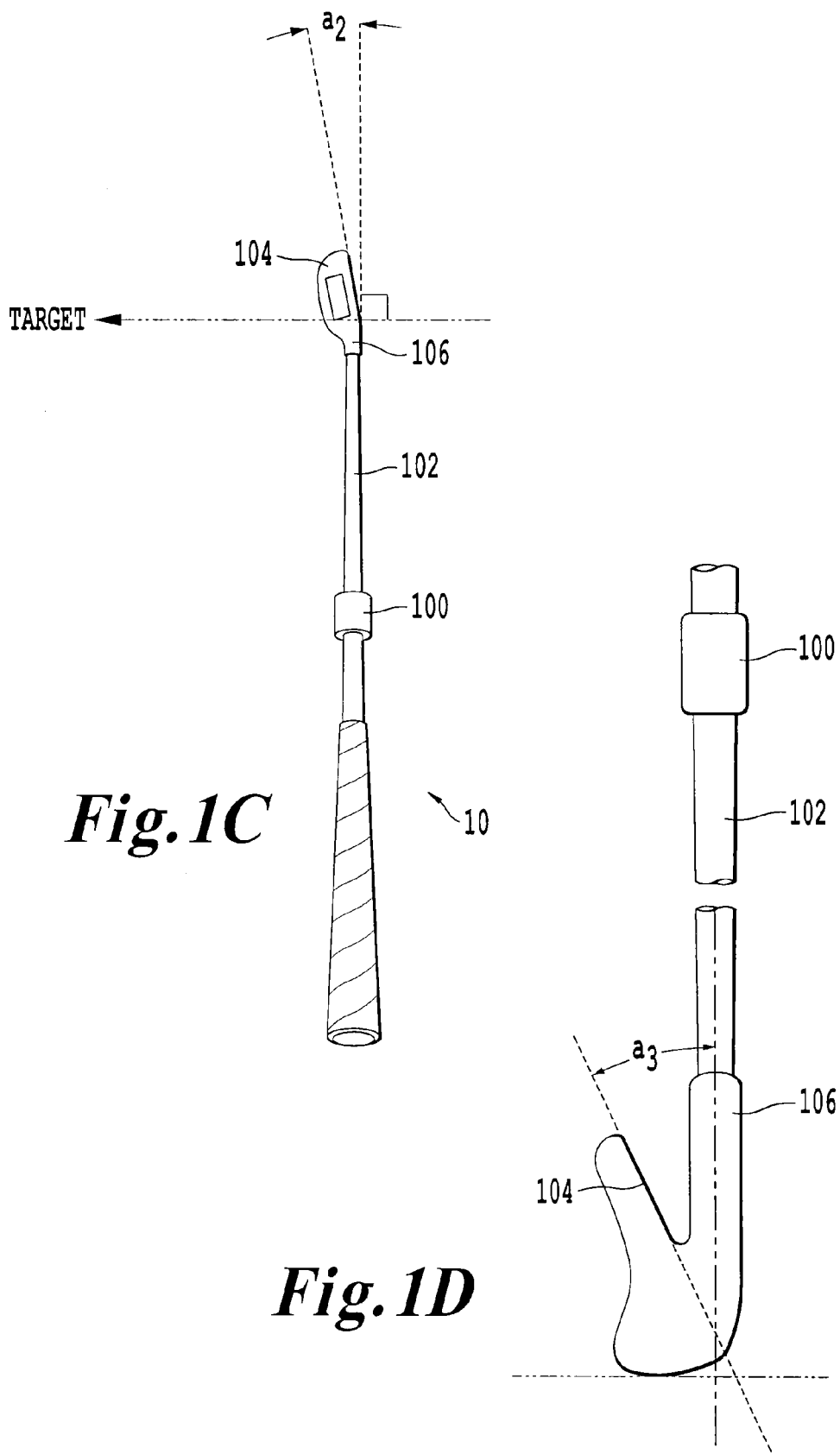

METHOD AND APPARATUS FOR DETERMINING A RELATIVE ORIENTATION OF POINTS ON A RIGID BODY

CROSS-REFERENCE TO RELATED APPLICATIONS

This application relates to and incorporates by reference the disclosures of U.S. patent application Ser. No. 13/744,308, filed Jan. 17, 2013 and U.S. patent application Ser. No. 13/744,300, filed Jan. 17, 2013.

BACKGROUND

1. Field of the Disclosure

The present disclosure relates to a device and method for performing an initial orientation calibration for an inertial measurement unit.

2. Description of the Related Art

An Inertial Measurement Unit (IMU) is an electronic sensor suite, generally comprised of accelerometers, gyroscopes, and magnetometers, which is used to measure the motion relative to an initial position and orientation. Among other things, IMUs are increasingly utilized to perform golf swing analysis, where the IMU measures the swing motion of a golf club relative to an initial position and orientation. However, an IMU is intrinsically unable to quantify the motion in terms of absolute position and orientation. For example, in a case where an IMU is utilized to perform a swing analysis in golf, the IMU can report that the club face closed 2° over the course of the swing, but it cannot determine whether the face was closed or open at the start of the swing. Thus, meaningful results often depend on a priori knowledge of the initial orientation of an IMU to its surroundings.

In a golf application, there are typically two necessary transformations that must be known when determining an initial IMU orientation in order to perform golf swing analysis. The first is a transformation from the initial IMU coordinate system to a world set of coordinates—usually those that describe the target line, vertical, and other relevant directions for the golf swing. The second is a transformation from the IMU to a coordinate system fixed in the golf club.

Methods for establishing the club transformation currently rely on some pre-defined protocol, rather than a direct measurement. For example, current methods assume that an IMU is placed at a particular position on the club shaft (e.g., the 3 o'clock position), and at a specific distance from the club face. However, any deviation from this pre-defined position will cause corresponding inaccuracies in the results. Similar methods rely on the golfer aligning the IMU device or/and the face normal to within a degree of some reference, which introduces user error. Consequently, the accuracy of many output parameters is limited not by the IMU itself, but rather by the uncertainty in the club face orientation.

Another method assumes that the club face points in a direction perpendicular to both the club shaft and gravity at the point of address (i.e., the point at which a golfer is in position to start a swing). This method is accurate only to the extent that the golfer addresses the ball with zero forward or backwards shaft lean, and with a perfectly flat lie. The latter consideration should be explicitly addressed: most golfers consider the club face square if the leading edge is perpendicular to the target line; however, if the club does not lie flat on the ground (many golfers address the ball with the toe up), the face normal does not point in the same direction, and thus is not square. Consequently, inaccuracies are introduced by utilizing this technique.

Another method correlates the club face normal with the direction of the initial motion of the club during takeaway (i.e., the initial movement of the golf club away from a golf ball during the swing). This is accurate only if two conditions are met: (1) the club face normal is square with the target line, and (2) the club moves along the target line during takeaway. These conditions are rarely met for the average golfer, which results in inaccurate swing analysis results.

A different class of methods require some procedure before the swing starts. These typically involve the use of a magnetometer. For example, one procedure requires the golf club to be held with zero shaft lean. When positioned correctly, it is tapped on the ground, which signals the electronics to reference the indicated target line (the direction perpendicular to the club shaft and gravity) to a particular compass direction. Alternately, the club can be pointed down the target line, which is again recorded with respect to the local magnetic field. Both these methods are quite susceptible to user error, and both assume the face normal was square with the target line at address, which is generally not true.

SUMMARY

Among other things, the present disclosure considers the problem of determining the relative orientation and distance separating at least two points on a rigid body. In one aspect of the present disclosure, an IMU is affixed at a first point of the rigid body, and an accelerometer is affixed at a second point of the rigid body. The IMU can include at least a gyroscope that measures an angular velocity and an angular acceleration, and a first accelerometer. The IMU can include a communications unit that receives a measurement signal, the measurement signal including a second acceleration transmitted from the second accelerometer. A controller included in the IMU can perform an initial orientation calibration by calculating a relative orientation of the inertial measurement unit and the second accelerometer, and a distance separating the inertial measurement unit and the second accelerometer.

By performing the initial orientation calibration, the controller can quantify with high accuracy subsequent movements of the rigid body in terms of absolute position and orientation of the IMU.

The foregoing paragraphs have been provided by way of general introduction, and are not intended to limit the scope of the following claims. The described embodiments, together with further advantages, will be best understood by reference to the following detailed description taken in conjunction with the accompanying drawings.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein:

FIG. 1C illustrates a top view of the FIG. 1A arrangement;

FIG. 1D illustrates a front view of the FIG. 1A arrangement;

DETAILED DESCRIPTION OF THE EMBODIMENTS

Figure 1A:
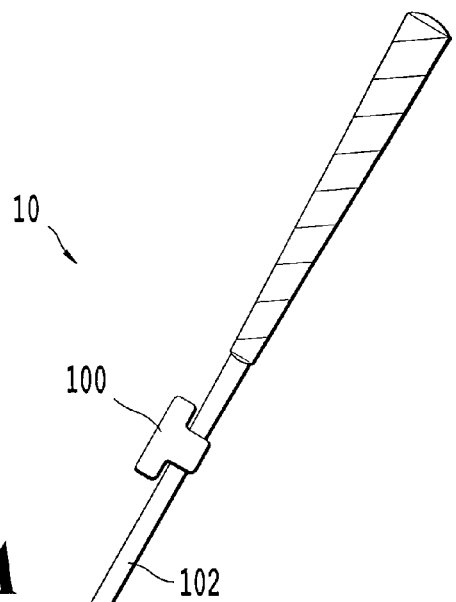
FIG. 1A illustrates an exemplary arrangement of IMUs for performing initial orientation calibration processing.

Referring now to the drawings, wherein like reference numerals designate identical or corresponding parts throughout the several views.

For simplicity, the present disclosure discusses a golf club as an exemplary application for the method and device described herein; however, it should be appreciated that the present disclosure is not limited to golf, and the features described herein may easily be adapted by one of ordinary skill for use in performing initial orientation calibrations for other rigid bodies.

FIG. 1A illustrates an exemplary arrangement of IMUs for performing initial orientation calibration processing for a golf club. The arrangement of FIG. 1A includes a golf club 10, which includes a shaft IMU 100 and a face IMU 101 respectively attached to a shaft 102 and face 104, where the face 104 is the striking surface of club head 106. The shaft IMU 100 and the face IMU 101 are assumed to be functionally similar devices, and are numbered distinctly in the figures merely to aid in distinguishing their mounting positions.

Figure 1B:
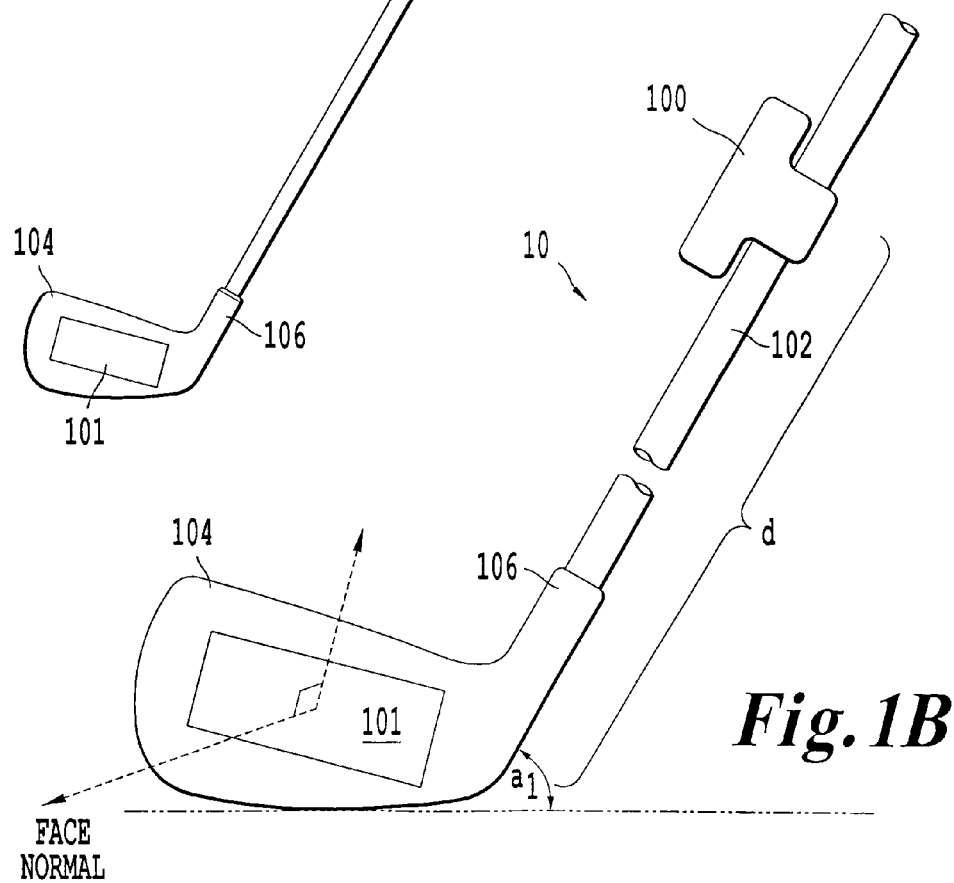
FIG. 1B illustrates a side perspective of the FIG. 1A arrangement.

For the purposes of illustrating the various factors used in the initial orientation calibration processing, FIGS. 1B-1D provide several alternate views of the golf club 10 of FIG. 1A.

FIG. 1B illustrates a side perspective of the golf club 10, where the face normal is shown as a vector that is perpendicular to the plane of the club face. FIG. 1B also shows the "lie angle" ($a_1$) of the golf club 10, which is defined herein as the angle between the shaft 102 and the sole of the head 106. Lastly, the distance (d) between the shaft IMU 100 and head 106 is calculated when performing the initial orientation calibration, as will be discussed further in later paragraphs.

FIG. 1C illustrates a top view of the golf club 10, where the "target line" and "face angle" ($a_2$) are shown. The target line is formed from the point at which the ball is struck to the target at which the golfer is aiming. The face angle is derived from the target line as the complement of the angle formed between the face 104 plane to the target line. The face angle may also be derived from the perspective of shot trajectory, where the face normal is projected on the horizontal plane, and the face angle is calculated by taking the difference between the projected face normal and the target line. When calculating face angle, the target line may be determined by assuming a predetermined offset from the club's face normal, where the offset may be dependent upon the loft angle of the club. The offsets to the face normal may be measured directly or may be stored in advance, e.g., as a tabular list based on club classification and/or loft.

FIG. 1D illustrates a front view of the golf club 10, where the "loft" angle ($a_3$) is shown. The loft angle is defined as the angle at which the face 104 of the club lies relative to a perfectly vertical axis represented by the shaft 102.

Referring back to the exemplary arrangement of FIG. 1A, in order to perform the initial orientation calibration processing of the present disclosure, the shaft IMU 100 mounted on the shaft 102 determines the distance from the shaft IMU 100 to the head 106 of the golf club 10, and the orientation of the face 104 relative to itself and the shaft IMU 100, including: the direction perpendicular to the plane of the club face (i.e., the face normal), and the direction of the leading edge of the face 104 (i.e., the face angle).

As shown in FIG. 1A, the initial orientation calibration processing of the present disclosure utilizes two IMUs: a first shaft IMU 100 located on the club shaft 102, and a second face IMU 101 on the club face 104. The face IMU 101 may be temporarily placed on the face 104 during the calibration, or may be a permanently fixed sensor suite. Further, the face IMU 101 could be a dedicated unit, or may be a suite of sensors imbedded in another device, such as a smartphone (e.g., Apple's iPhone). Including two IMUs to perform the initial orientation calibration, as in the exemplary arrangement of FIG. 1A, provides for subsequent quantification of swing motion in terms of absolute position and orientation with high accuracy, while largely eliminating inaccuracies due to user error.

Figure 2:
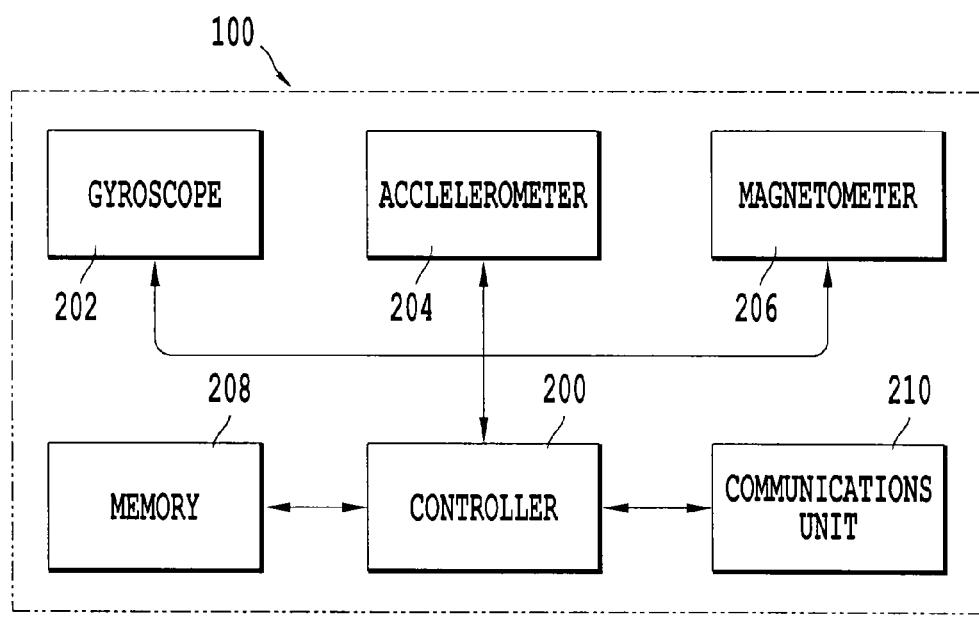
FIG. 2 illustrates an exemplary block diagram for an IMU.

FIG. 2 illustrates an exemplary block diagram for the shaft IMU 100. The exemplary shaft IMU 100 includes a controller 200, a gyroscope 202, an accelerometer 204, a magnetometer 206, a memory 208, and a communications unit 210. As mentioned previously, the shaft IMU 100 is functionally similar to the face IMU 101 in that both units may include similar elements and perform similar features.

The controller 200 may be any processor unit capable of executing instructions. The gyroscope 202 is a device for measuring motion around an axis, including the angular velocity of the shaft IMU 100 with respect to a given axis. The accelerometer 204 is a device for measuring the acceleration of the shaft IMU 100 relative to a local inertial frame, and may output the acceleration as a vector quantity including magnitude and orientation. The magnetometer 206 is a device for measuring the strength and direction of magnetic fields. The memory 208 is a memory unit including volatile memory, non-volatile memory, or a combination thereof, and may be utilized by the controller 200 for storage during the initial orientation calibration processing, or the memory 208 may store computer readable instructions to be executed by the controller 200. Lastly, the communications unit 210 is a device for communicating with other external devices, such as when exchanging outputs between the respective sensors of the shaft IMU 100 and the face IMU 101. The communications unit 210 may send and receive signals using a wireless or wired communications protocol, such as Wi-Fi, Bluetooth, Ethernet, a cellular network, or the like.

The controller 200 receives an input including measurement data from both the shaft IMU 100 and the face IMU 101. The measurement data is compared in the context of a rigid body model, and is used to calculate at least the relative distance and orientation between the two IMU's coordinate frames.

The controller 200 may perform initial orientation calibration processing to calculate a distance from the shaft IMU 100 to the head 106 of the golf club 10, the face normal of the club, and the direction of the leading edge of the face 104 (i.e., the face angle), via algorithms that include the output of the respective gyroscope 202 and/or accelerometer 204 of the shaft IMU 100 and the face IMU 101. The magnetometer 206 could be used as well; however, the processing should compensate for soft-iron effects produced by the nearby metallic golf club and therefore, use of the magnetometer 206 in the calibration is not preferred.

Regarding the gyroscope 202, the initial orientation calibration algorithm assumes that angular velocity is equivalent at all points on a rigid body in an inertial frame. A fitting algorithm can find a best fit transformation that rotates all the measurements from one IMU's gyroscope 202 to align with those from the other IMU. The resulting rotation describes the relative orientation of the two IMU devices. This can be repeatedly done with sub-degree precision, which provides for high accuracy measurement of the location and orientation of the shaft IMU 100 during a golf swing, which can be utilized for subsequent swing analyses.

Regarding the accelerometer 204, the initial orientation calibration algorithm assumes accelerations at different points on a rigid body are, in general, not equal. However, their relative difference can be found if the distance between the points, along with the body's instantaneous angular velocity and angular acceleration, is known. Thus, a best fit algorithm can take the acceleration and rotational information from the accelerometer 204 in both IMUs, and solve for the distance and orientation between the frames that produces the closest match.

Alternatively, rotational motion of the club can be explicitly disallowed during the initial orientation calibration. If the angular velocity and its derivative are negligible, then the acceleration at each point on the rigid body is equivalent, and the calibration can proceed as in the gyroscope 202 case. A simple example of this type of calibration is the "face level" procedure. In this procedure, the golf club 10 is manipulated until its face normal and an axis of the face IMU 101 lying on its face 104 point in the direction of gravity. In the non-limiting example of utilizing a smartphone sensor sweet at the face IMU 101, the smartphone may perform this feature by, e.g., displaying a surface level on the screen of the smartphone as a guide to the user. At this point, the measurements of both accelerometers 204 will be dominated by gravity. Therefore, the shaft IMU 100 on the golf club shaft 102 can record its measurement of gravity as the club face normal in its coordinate frame.

Once the face normal has been found, the lie and loft of the club can be closely estimated. As a non-limiting example, the angle between the club shaft and the face normal (which are now both known by the shaft IMU 100) can be matched to a database of possible clubs, and the lie and loft parameters of the closest matching club can be used as initial values in an approximation algorithm.

An exemplary method of calculating the face normal using the gyroscope 202 output in the initial orientation calibration will now be described.

Gyroscope Face Normal

The controller 200 may calculate the face normal via a fitting algorithm stored in the memory 208. This algorithm takes two time series of angular velocity measurements, each from a different IMU (e.g., shaft IMU 100 and face IMU 101), and finds a rotation that best aligns the two series. For illustration purposes, the present disclosure refers to angular velocity measurement vectors in the shaft IMU 100 frame as $s_i$, and those in the club face IMU 101 frame as $c_i$, where the i subscript designates the index of a particular vector in a time series of measurements.

As a non-limiting example of finding the "best" alignment between the IMUs' time series angular velocities, the controller 200 can determine the unique rotation that minimizes some function of the mismatch between angular velocity measurements. To this end, a least squares error metric can be used (Equation 1):

$$\chi^2 = \sum_i^N (Rc_i - s_i)^2$$

In this exemplary method, the controller 200 executes the fitting algorithm to determine the minimum angular velocity mismatch by varying the rotation matrix R to minimize the chi-squared value of Equation 1. Expanding the chi-squared term (Equation 2):

$$(Rc_i - s_i)^2 = c_i^T c_i + s_i^T s_i - 2 s_i^T Rc$$

The first two terms of Equation 2 do not vary with R. Consequently, the optimum fit procedure reduces to maximizing the last term. Since this problem is linear in R, finding an exact solution should be expected. However, only three of the nine components in a rotation matrix are independent, which complicates the algebra. Instead, it is more convenient to present the rotation using unit quaternions. Quaternions are 4-dimensional complex numbers capable of elegantly representing rotations. According to the properties of quaternion conjugation, the least squares problem in quaternion form is (Equation 3):

$$\max \sum_i^N (qc_i q^* \cdot s_i)$$

where q represents the unit rotation quaternion that must be determined, and $c_i$ and $s_i$ are now quaternions that represent the angular velocity vectors. Applying the definition of the quaternion product, it can be shown that (Equation 4):

$$(qc_i q^*) \cdot s_i = qc_i \cdot s_i q$$

These terms can be represented as matrix products by defining two new matrices:

$$C_i = \begin{bmatrix} 0 & -c_{i1} & -c_{i2} & -c_{i3} \\ c_{i1} & 0 & c_{i3} & -c_{i2} \\ c_{i2} & -c_{i3} & 0 & c_{i1} \\ c_{i3} & c_{i2} & -c_{i1} & 0 \end{bmatrix} \text{ and}$$

$$S_i = \begin{bmatrix} 0 & -s_{i1} & -s_{i2} & -s_{i3} \\ s_{i1} & 0 & -s_{i3} & s_{i2} \\ s_{i2} & s_{i3} & 0 & -s_{i1} \\ s_{i3} & -s_{i2} & s_{i1} & 0 \end{bmatrix}$$

Now (Equation 5), $$\sum_i^N (qc_i q^*) \cdot s_i = \sum_i^N qc_i \cdot s_i q$$

$$= \sum_i^N (C_i q) \cdot (S_i q)$$

$$= \sum_i^N q^T C_i^T S_i q$$

$$q^T \left( \sum_{i}^{N} C_i^T S_i \right) q$$
$$= q^T M q$$

Each $C_i^T S_i$ term is symmetric, as is their sum M. As a 4×4 symmetric matrix, M has only real eigenvalues, and its eigenvectors can be chosen such that they are all orthogonal and span out solution space. Thus, the best fit rotation quaternion can be described as a linear combination of these vectors. If the algorithm is restricted to quaternions of unit length, as those that represent rotations must be, the equation can be maximized by choosing the eigenvector with the highest eigenvalue.

Figure 3:
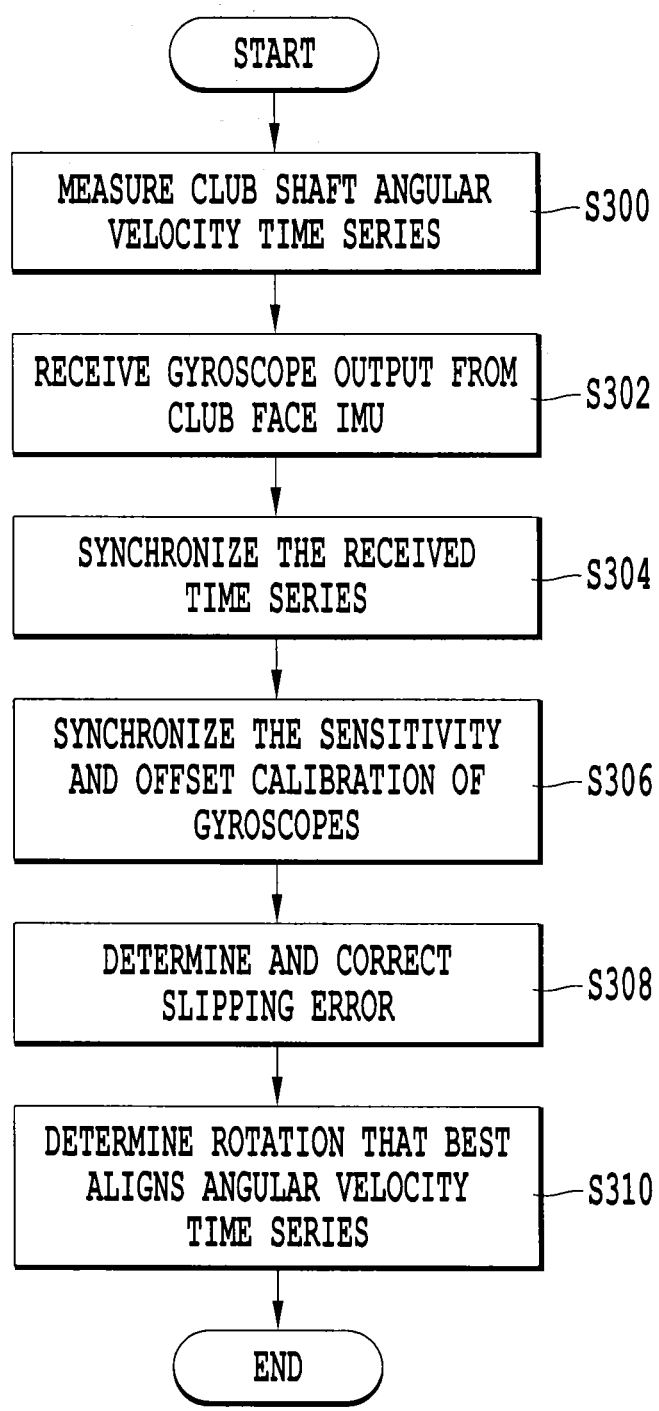
FIG. 3 illustrates an exemplary flow chart for a face normal calibration.

In view of the above discussion, a face normal calibration method using the gyroscope 202 follows below, with reference to FIG. 3:

At step S300, the shaft IMU 100's time series angular velocity is measured via the gyroscope 202 of the shaft IMU 100. The angular velocity measurements may be generated by a user moving the golf club 10 in a predetermined manner. In the case of using a smartphone as the face IMU 101, an application for generating movement for the face normal determination may be used.

Next, the controller 200 of the shaft IMU 100 receives a time series angular velocity output from the face IMU 101 via the communications unit 210 at step S302. The face IMU 101 may send its output based on an active request from the shaft IMU 100. Alternatively, the face IMU 101 may send its output based on a detected movement of the face IMU 101, or by a similar mechanism that allows the shaft IMU 100 to receive signals passively.

At step S304, the controller 200 of the shaft IMU 100 synchronizes the time series angular velocity inputs from each gyroscope 202 sensor (i.e., from IMU 100 and 101). Since the time series were collected by independent IMUs, there will likely be an offset between the two time series. This offset can be found by taking the shorter time series, and applying a normalized cross-correlation to the magnitudes of the angular velocity at each possible offset into the longer time series. The closest offset can be identified by the highest cross-correlation number, which should range between ±1. In testing performed with an ITG-3050 gyroscope at the club shaft, and the gyroscope in an iPhone placed on the club face, this offset value is found to be greater than 0.95.

At step S306, the controller 200 of the shaft IMU 100 synchronizes the sensitivity and offset calibration of the gyroscopes. Each gyroscope 202 should have closely zeroed offsets, however their sensitivity may differ slightly. While not necessarily important for cross-correlation or finding the orientation between frames, synchronizing the sensitivity helps mitigate the effects of slipping, as described further in the next step. To do so, the controller 200 applies a robust linear fit to find the parameters A and B in the following expression (Equation 6):

$$S_i = A + B * C_i.$$

This fit should be robust since errors caused by slipping are not normally distributed, and can substantially skew a least squares fit. In this case, the least squares metric is replaced with a double exponential.

At step S308, the controller 200 of the shaft IMU 100 determines any measurement error caused by IMU slippage and corrects for this error. In some cases (e.g., when using a smartphone), the face IMU 101 on the club face 104 can slip during a face normal calibration. The calibration is affected by this slipping in two ways. First, during the slipping itself, the angular velocities at each IMU will not be the same. Secondly, the transformation between the IMU frames will be different after slipping. Thus, areas of slipping should be identified and corrected. Slipping may be identified, e.g., by examining the magnitudes of each angular velocity sample and identifying those values that differ by a significant amount, which may be determined in advance. As a non-limiting example of correcting for IMU slippage, the controller 200 can partition the time series angular velocities into multiple, non-slipping segments. Each partitioned segment can be processed separately, and their results can be incorporated into an average weighted by the length of each segment.

After the time series have been synchronized and treated for slipping, the shaft IMU 100 controller 200 at step S310 solves for the rotation between the IMU frames. In general, the rotation between IMU frames may be solved by finding a best fit transformation between the IMU coordinate frames. As a non-limiting example of solving for the rotation, each IMU angular velocity sample is converted to its quaternion matrix form, and multiplied by its counterpart from the other IMU. These matrices are summed together, and an eigenvalue and eigenvector analysis is performed on the resulting symmetric matrix. The normalized eigenvector associated with the largest eigenvalue is taken as the rotation quaternion. It should be noted that there are two normalized quaternions associated with this eigenvector, both negatives of each other. Since the first term in a rotation quaternion yields a cosine of half the rotation angle, it should always be positive. This constraint allows us to reduce the solution to a unique rotation between IMU frames.

Next, two methods are presented for performing a face normal calibration using the two accelerometers 204 of the shaft IMU 100 and the face IMU 101, respectively. The two exemplary methods described below respectively apply to conditions of negligible and non-negligible angular motion.

Negligible Angular Motion

Certain motions of the golf club 10 may have negligible angular motion. This can occur when the magnitudes of both the angular velocity and angular acceleration of the club are small enough that it can be assumed that the acceleration at either the shaft IMU 100 and the face IMU 101 is only comprised of gravity and lateral acceleration. If this is valid, then each IMU accelerometer 204 should measure the same vector, and calibration can proceed as in the gyroscope face normal method discussed above.

Non-Negligible Angular Motion

If angular motion cannot be considered to be negligible, then the rotation motion of the club should be used to equate the accelerations at the two IMU's. In addition to the two accelerometers 204 in the face and shaft IMUs, the method assuming non-negligible angular motion utilizes one gyroscope 202. A second gyroscope 202 from one of the respective IMUs is not needed in this case because the angular velocity at every point on the club is the same in direction and magnitude. Eliminating the need for a second gyroscope 202 is convenient when the face IMU 101 does not have a gyroscope, such as in early iPhone models (i.e., when a smartphone is utilized for providing the IMU sensors). This method can also produce the distance between the two accelerometers 204.

Figure 4:
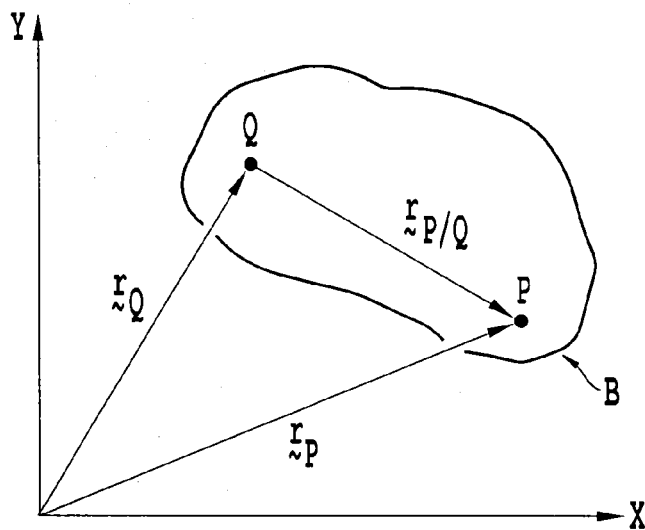
FIG. 4 illustrates a graph for deriving the acceleration at a point on a rigid body.

The following derivation demonstrates processing to calculate the acceleration at a first point (P) on a rigid body (i.e., face IMU 101 at the face 104) given the acceleration at a second point (Q) on the rigid body (i.e., shaft IMU 100), with reference to the graph illustrated in FIG. 4. The method assumes an inertial frame with an origin fixed at an arbitrary point. At any given time, the position of P can be given by (Equation 7):

$$r_P(t) = r_Q(t) + r_{P/Q}(t)$$

where the dependence of each vector on time is made explicit. Note that $r_{P/Q}$—the distance in the body from point Q to point P—changes only in direction, not in magnitude. To find the velocity at point P, we take the derivative of $r_P$ (t) with respect to time (Equation 8):

$$\frac{dr_P(t)}{dt} = \frac{dr_Q(t)}{dt} + \frac{dr_{P/Q}(t)}{dt} = \frac{dr_Q(t)}{dt} + \omega(t) \times r_{P/Q}(t)$$

Note that the derivative of $r_{P/Q}(t)$ is expressed in Equation 8 in terms of ω, the angular velocity of the rigid body. As in Equation 7, Equation 8 explicitly shows the dependence of this angular velocity parameter on time.

Finally, to determine acceleration, we again take a derivative with respect to time (Equation 9):

$$\frac{d^2 r_P(t)}{dt^2} = \frac{d^2 r_Q(t)}{dt^2} + \frac{d\omega(t)}{dt} \times r_{P/Q}(t) + \omega(t) \times \frac{dr_{P/Q}(t)}{dt}$$

$$\frac{d^2 r_P(t)}{dt^2} = \frac{d^2 r_Q(t)}{dt^2} + \frac{d\omega(t)}{dt} \times r_{P/Q}(t) + \omega(t) \times (\omega(t) \times r_{P/Q}(t))$$

$$\frac{d^2 r_P}{dt^2} = \frac{d^2 r_Q}{dt^2} + \alpha \times r_{P/Q} + \omega \times (\omega \times r_{P/Q})$$

Equation 9 provides an expression for the acceleration at point P (e.g., face IMU 101) in terms of the acceleration at point Q (e.g., shaft IMU 100), the angular velocity (ω) and angular acceleration (α) of the rigid body (e.g., the golf club 10), and the distance between the IMUs ($r_{P/Q}$—see, e.g., distance d of FIG. 1B). This expression is written in an arbitrary inertial frame; however, for convenience the inertial frame that aligns exactly with the shaft IMU frame at time t is chosen.

In the exemplary case of the golf club 10 being the rigid body, the acceleration at point Q (i.e., the shaft IMU 100) with respect to time ($d^2 r_Q/dt^2$) of Equation 9 is provided by the shaft IMU 100 accelerometer 204, and ω and α are furnished by the shaft IMU 100 gyroscope 202. The acceleration at point P (i.e., the face IMU 101) with respect to time ($d^2 r_P/dt^2$) is measured by the face IMU 101 accelerometer 204, albeit in a coordinate frame separated from the shaft IMU 100 by an unknown rotation. The controller 200 of either IMU can solve for this unknown rotation (and by extension the face normal) and $r_{P/Q}$ (the distance between accelerometers) using a non-linear fitting algorithm, such as the Marquardt method.

In light of the above described derivation of face normal and IMU separation distance calculations, a method of calculating these terms will now be described with respect to the exemplary flow chart shown in FIG. 5. Note that controller 200 of the shaft IMU 100 performs the processing in the exemplary method of FIG. 5. This arrangement allows a single shaft IMU to remain on the shaft 102 during a swing to provide the acceleration of the shaft IMU 100, and the acceleration of the face 104 can then be calculated after performing the initial orientation calibration using the above equations. That is, once the initial orientation calibration is performed, the face IMU 101 can be removed from the face 104 and the shaft IMU 100 can calculate the absolute position, speed, etc. of the face 104, which can then be utilized to perform automated swing analysis techniques. However, the present method could easily be adapted such that either IMU's controller performs some or all of the processing. Further, the exemplary method of FIG. 5 is discussed using golf club 10 of FIG. 1A as the rigid body, but it should be appreciated that the method may easily be adapted to other rigid bodies.

Figure 5:
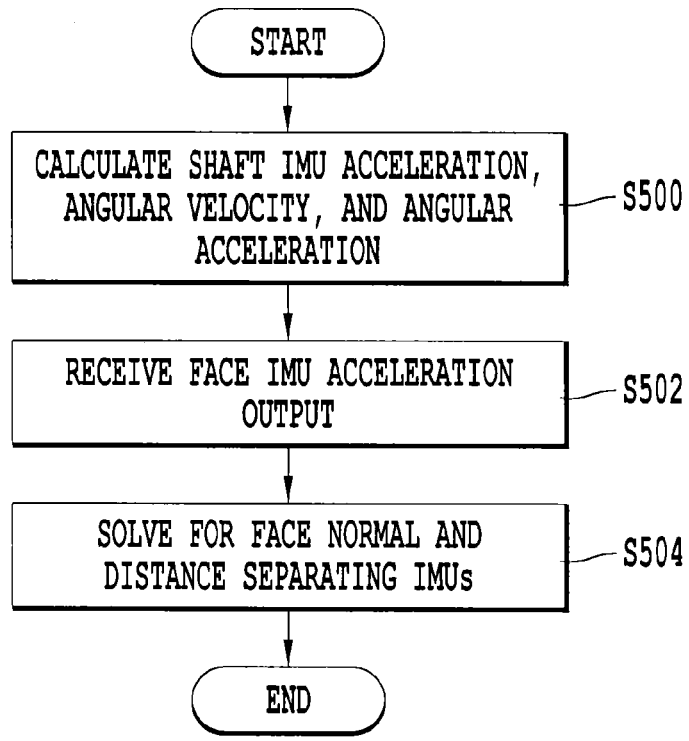
FIG. 5 illustrates an exemplary flow chart for calculating a golf club face normal and distance from a shaft IMU to the club head.

Referring to FIG. 5, the controller 200 of the shaft IMU 100 at step S500 determines the shaft IMU 100's acceleration, angular velocity (ω), and angular acceleration (α). The shaft IMU 100 acceleration can be measured using the IMU's accelerometer 204, and the angular velocity and angular acceleration can be measured using the IMU's gyroscope 202.

At step S502, the controller 200 of the shaft IMU 100 receives a measured face IMU 101 acceleration input via the IMUs' respective communications unit 210. The face IMU 101 acceleration can be measured simultaneously with the above-mentioned shaft IMU 100 parameters. The measured acceleration can then be transmitted to the shaft IMU 100 automatically or based upon an active request to transmit.

At step S504, the controller 200 of the shaft IMU 100 inputs the received face IMU 101 acceleration and the measured shaft IMU 100 acceleration, angular velocity, and angular accerleration into a fitting algorithm and solves for an unknown rotation separating the two IMUs' respective inertial frames, thereby providing the face normal of the golf club 10. The controller 200 of the shaft IMU 100 also solves for the distances separating the shaft IMU 100 and the face IMU 101. These parameters may be determined using a fitting algorithm in conjunction with an equation defining the parameters in terms of the measured/received parameters of steps S500 and S502 (e.g., Equation 9), or by another fitting method.

Next, processing to determine the golf club 10 lie and loft will be described. As previously noted, lie and loft are respectively illustrated by angle $a_1$ of FIG. 1B and angle $a_3$ of FIG. 1D.

The processing assumes the angle between the club shaft and the face normal, which is referred hereinafter as the "lieft" angle, is known or can be calculated based on the face normal. The face normal can be determined as in the aforementioned methods using the gyroscope 202 and/or accelerometer 204, or may be determined by another method. As a non-limiting example, the lieft angle may be calculated by determining the axis of the club shaft by the shaft IMU 100, then calculating the angle between this axis and the face normal.

Figure 6:
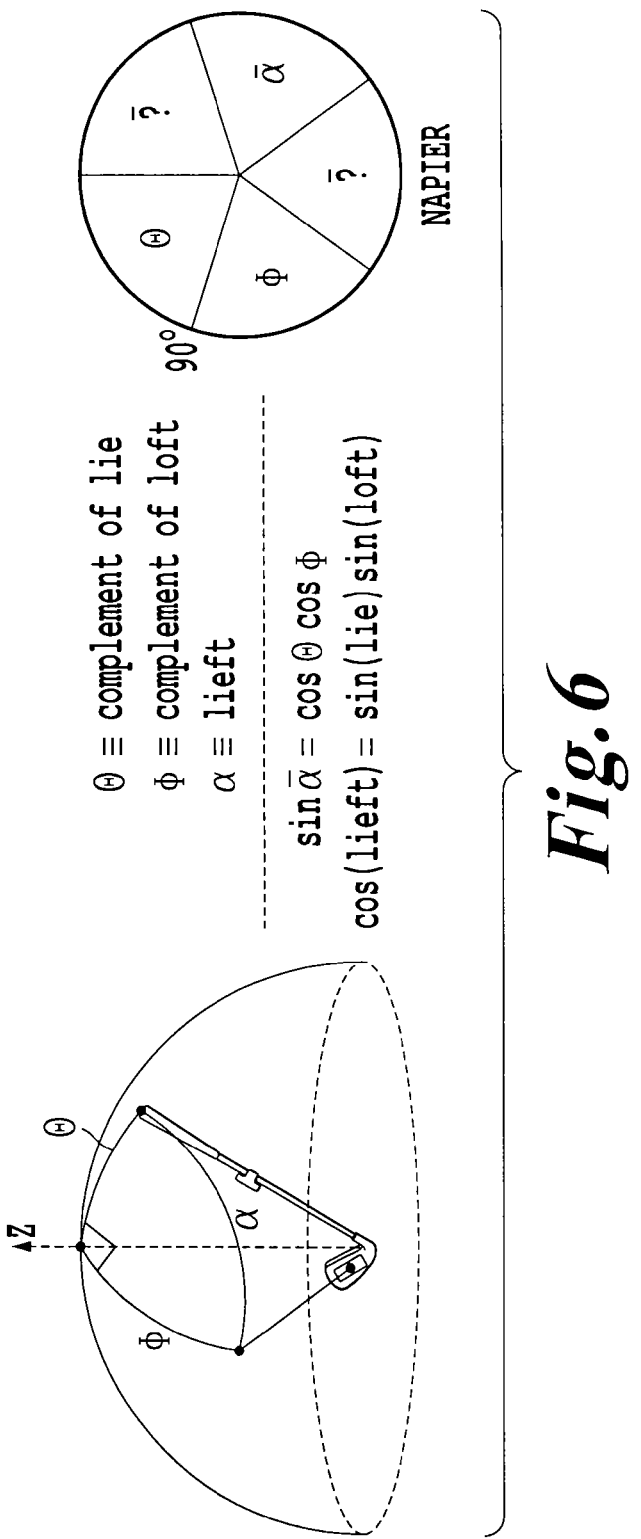
FIG. 6 illustrates the trigonometric relationships of various golf club characteristics.

The relationship of lieft, lie, and loft can be readily described by spherical trigonometry, as illustrated in FIG. 6. As shown in FIG. 6, the lieft, lie, and loft terms can be defined by the following Equation 10:

$$\cos(\text{lieft}) = \sin(\text{loft})\sin(\text{lie})$$

Thus, there are two unknowns—lie and loft—but only one equation. To find values for lie and loft, the controller 200 must determine additional information. Two methods for addressing this limitation are described below.

A first exemplary method is to match the measured/known lieft value to a default set of clubs containing the measured club, the default set of clubs being categorized by their lieft. For example, the controller 200 determines a lieft of 64° for the golf club 10 and, based on information included in the default set of clubs stored in the memory 208, matches the measured lieft value with a 6-iron. Once the controller 200 identifies a matching club, the controller 200 can use its corresponding default lie (or loft) to calculate a loft (or lie) value exactly. This solution is referred hereinafter as the "Constant Method."

Figure 7:
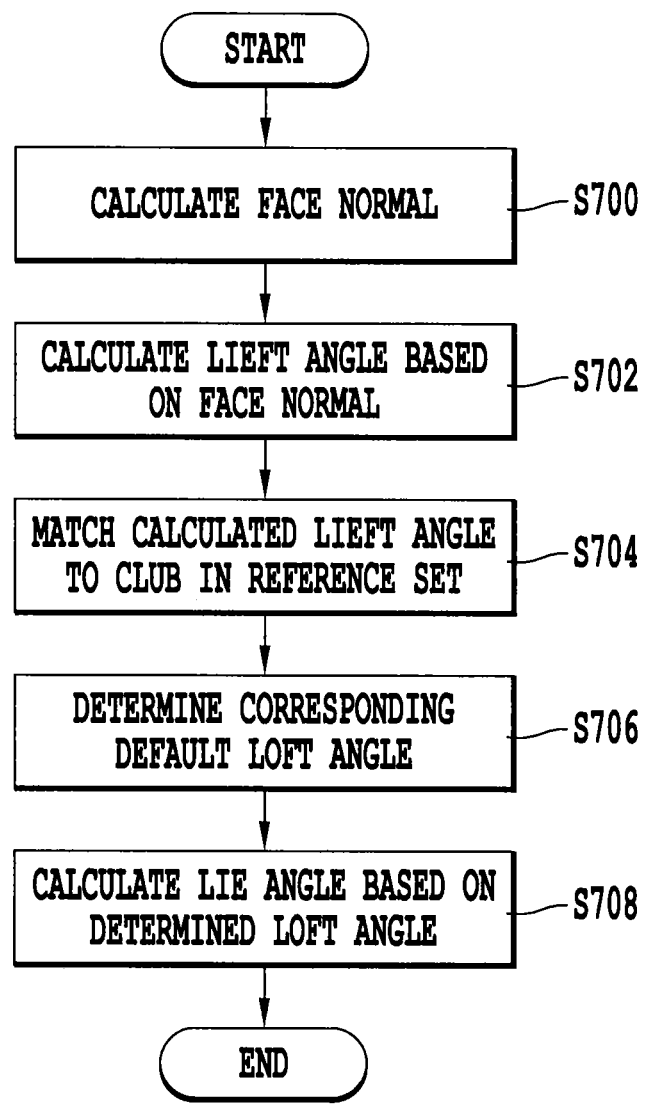
FIG. 7 illustrates an exemplary flow chart for calculating a golf club lie and loft angle.

FIG. 7 illustrates an exemplary flowchart for calculating lie angle under the Constant method. As one can appreciate from the above discussion, the exemplary method of FIG. 7 could easily be adapted to calculate loft angle rather than lie angle.

Referring to FIG. 7, the controller 200 of the shaft IMU 100 calculates the face normal of the golf club 10 at step S700. The face normal may be calculated using one of the previously described methods, (see, e.g., FIGS. 3 and 5), or may be determined using another method.

At step S702, the controller 200 of the shaft IMU 100 calculates the lieft angle of the golf club 10, based on the calculated face normal.

At step S704, the controller 200 of the shaft IMU 100 matches the calculated lieft angle to a club included in a reference set of clubs, where information including characteristics for matching the club are stored in the memory 208 of the shaft IMU 100.

At step S706, the controller 200 of the shaft IMU 100 determines a default loft angle that corresponds to the determined lieft angle.

At step S708, the controller 200 of the shaft IMU 100 calculates the lie angle of the golf club 10, based on the lieft angle and the loft angle. The lie angle may be calculated using trigonometric relationships between the angles, such as Equation 10.

Figure 8:
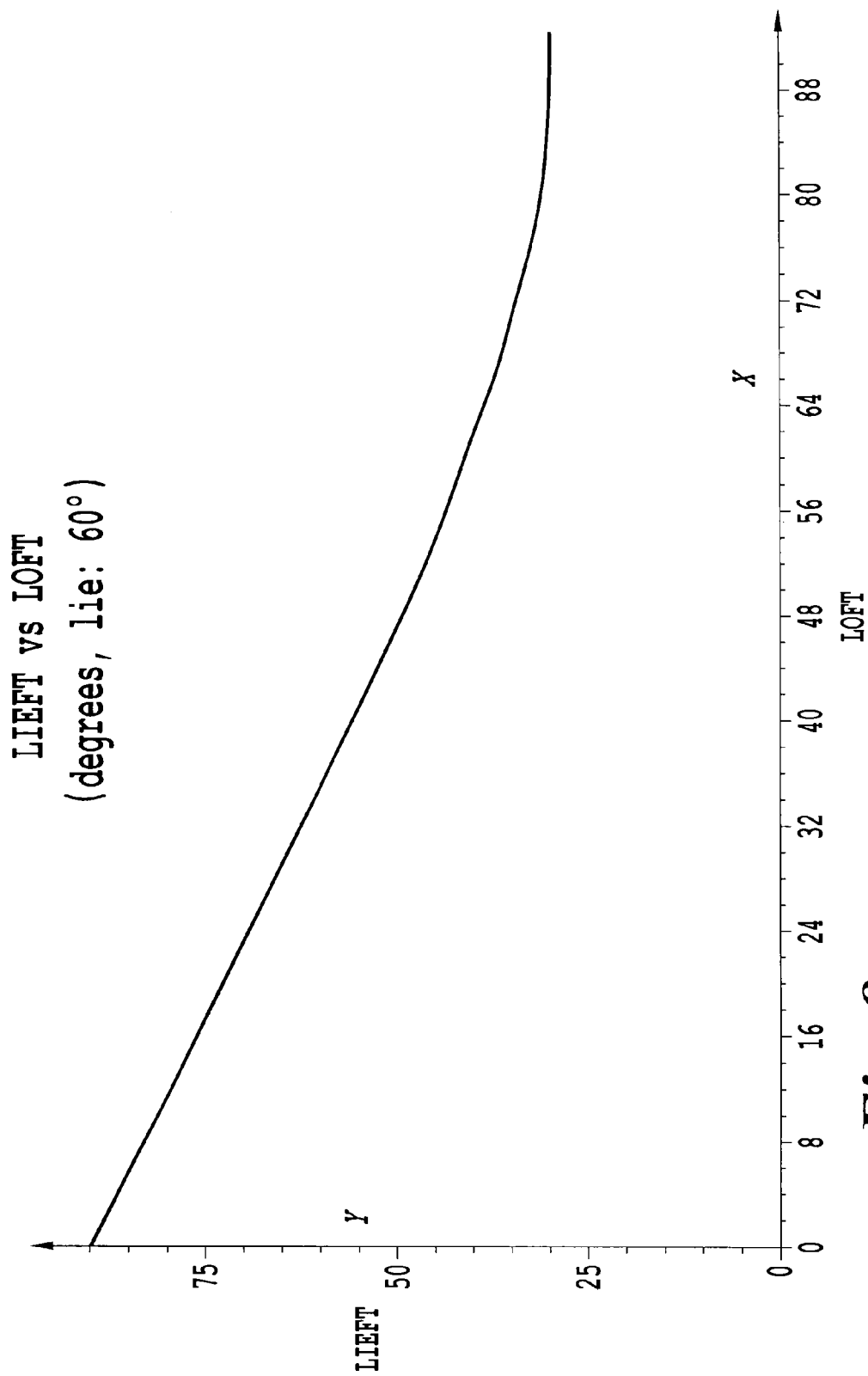
FIG. 8 graphically illustrates a variation in lieft angle given a change in loft.

FIG. 8 illustrates how the value of lieft varies with loft using the Constant Method with a nominal lie value of 60°. As shown in FIG. 8, this relationship is mostly linear over the [0°, 70°] domain, which also conveniently encompasses the loft of most golf clubs. It can be shown that this slope must be ≤1 (Equation 11):

$$\frac{d(\text{lieft})}{d(\text{loft})} = \frac{\sin(\text{lie})\cos(\text{loft})}{\sqrt{1 - \sin^2(\text{lie})\sin^2(\text{loft})}}$$

$$\frac{d(\text{lieft})}{d(\text{loft})} = \frac{\cos(\text{loft})}{\sqrt{\cos^2(\text{lie}) + 1 - \sin^2(\text{loft})}}$$

$$\frac{d(\text{lieft})}{d(\text{loft})} = \frac{1}{\sqrt{\left(\frac{\cot(\text{lie})}{\cos(\text{loft})}\right)^2 + 1}}$$

Referring to the above equations, since the squared term in the denominator must be ≥0, the denominator must be greater than the numerator. Thus, small differences in the lieft value will be magnified when determining loft. This effect is more significant for lie since the equation is symmetric, and because lie is usually greater than loft, the denominator is even larger.

This is problematic because the measured lieft is expected to differ from the default club's lieft for two reasons. First, since clubs are not made identically, the default club will generally not have the same measurements as the true club, even in the absence of measurement error. For example, the default club loft for a 6-iron might be 29°, but the measured club might have a true loft value of 31°. Second, the measured lieft—while accurate—will still vary from the true value by some small error. Thus, the Constant Method can have inherent error, especially at low lie values and high loft values.

The Constant Method always holds either lie or loft constant, while the other is varied to meet the measured lieft. If instead the controller 200 varies both lie and loft together, the results can be substantially improved. A second exemplary processing method incorporating this characteristic, which is hereinafter referred as the "Gradient Method," is discussed in detail below.

The Gradient Method assumes that any changes in lieft are small, such that it varies linearly with lie and loft. The expression for lieft under the Gradient Method is (Equation 12):

$$\cos(\text{lieft}) = g(\Delta\theta, \Delta\phi) = \sin(\theta_0) + \cos(\theta_0) \cdot \Delta\theta(\sin(\phi_0) + \cos(\phi_0) \cdot \Delta\phi)$$

where $\theta_0$ is the initial lie, $\Delta\theta$ is the change in lie, $\phi_0$ is the initial loft, and $\Delta\phi$ is the change in loft.

Once again this equation defines an overdetermined system, and the controller 200 cannot solve for the changes in lie and loft without another equation. However, if it is intuitively recognized that larger changes in lie and loft are less probable than smaller ones, it is reasonable to determine the solution with the smallest norm. Stated mathematically, the controller 200 can perform processing to find a solution to the function 'g' of Equation 12 that minimizes 'f' (Equation 13):

$$f(\Delta\theta, \Delta\phi) = (\Delta\theta)^2 + (\Delta\phi)^2$$

This solution can be found using Lagrangian multipliers. To make the mathematics more manageable, the controller 200 may additionally assume that $\Delta\phi\Delta\theta$ term is negligible. Omitting the calculations for brevity, the resulting solution is (Equation 14):

$$\Delta\theta = \Delta l\left(\frac{\cos\theta_0\sin\phi_0}{\cos^2\phi_0\sin^2\theta_0 + \cos^2\theta_0\sin^2\phi_0}\right)$$

$$\Delta\phi = \Delta l\left(\frac{\cos\phi_0\sin\theta_0}{\cos^2\phi_0\sin^2\theta_0 + \cos^2\theta_0\sin^2\phi_0}\right)$$

where $\Delta l$ is cos(measured lieft)−cos(default club lieft).

Note that for this choice of 'g' and 'f,' the lie and loft are varied proportionally to their components in the gradient 'g.'

The controller 200 can find the new slope of the lieft versus loft curve as follows (Equation 15):

$$\frac{d(\text{lieft})}{d(\text{loft})} =$$

$$\frac{d(\text{lieft})}{dl}\frac{dl}{d\theta}\left(\frac{1}{\sqrt{1 - \sin^1\theta_0\sin^2\phi_0}}\right)\left(\frac{\cos^2\phi_0\sin^2\theta_0 + \cos^2\theta_0\sin^2\phi_0}{\cos\theta_0\sin\phi_0}\right) =$$

$$\frac{\cos^2\phi_0\sin^2\theta_0 + \cos^2\theta_0\sin^2\phi_0}{\cos\theta_0\sin\phi_0\sqrt{1 - \sin^2\theta_0\sin^2\phi_0}}$$

By dividing this slope with the previously determined slope, it can be shown that the resultant value is greater by a factor of $1+\cot^2\theta\tan^2\phi$, and thus is always a larger value. Equivalent equations for the slope of the lieft versus lie curve are found switching $\phi$ and $\theta$.

Based on the above calculations, the slopes with loft (Table 1) or lie (Table 2) held constant, and also with both loft and lie varied along the gradient (Table 3), are tabulated below:

TABLE 1

Slopes of Lieft vs. Loft (Lie Constant)
SLOPE OF LIEFT VS LOFT

| | | Loft | | | | |
|---|---|---|---|---|---|---|
| Lie | | 10 | 20 | 30 | 40 | 50 | 60 |
| 55 | Lie | 0.80 | 0.80 | 0.77 | 0.74 | 0.68 | 0.58 |
| | Grad | 0.83 | 0.85 | 0.90 | 0.99 | 1.15 | 1.45 |
| 60 | Lie | 0.86 | 0.85 | 0.83 | 0.80 | 0.74 | 0.65 |
| | Grad | 0.87 | 0.89 | 0.92 | 0.98 | 1.10 | 1.31 |
| 65 | Lie | 0.90 | 0.90 | 0.88 | 0.85 | 0.81 | 0.73 |
| | Grad | 0.90 | 0.92 | 0.94 | 0.98 | 1.06 | 1.21 |

TABLE 2

Slopes of Lieft vs. Lie (Loft Constant)
SLOPE OF LIEFT VS LIE

| | | Loft | | | | | |
|---|---|---|---|---|---|---|---|
| Lie | | 10 | 20 | 30 | 40 | 50 | 60 |
| 55 | Loft | 0.10 | 0.20 | 0.31 | 0.43 | 0.56 | 0.70 |
| | Grad | 6.70 | 3.35 | 2.24 | 1.69 | 1.37 | 1.18 |
| 60 | Loft | 0.09 | 0.18 | 0.28 | 0.39 | 0.51 | 0.65 |
| | Grad | 8.56 | 4.23 | 2.77 | 2.04 | 1.59 | 1.31 |
| 65 | Loft | 0.07 | 0.15 | 0.24 | 0.33 | 0.45 | 0.59 |
| | Grad | 11.0 | 5.43 | 3.51 | 2.52 | 1.91 | 1.50 |

TABLE 3

Lieft Gradient Magnitude
LIEFT GRADIENT MAGNITUDE

| | Loft | | | | | |
|---|---|---|---|---|---|---|
| Lie | 10 | 20 | 30 | 40 | 50 | 60 |
| 55 | 0.82 | 0.83 | 0.84 | 0.86 | 0.88 | 0.91 |
| 60 | 0.87 | 0.87 | 0.88 | 0.89 | 0.90 | 0.93 |
| 65 | 0.91 | 0.91 | 0.91 | 0.92 | 0.93 | 0.94 |

A higher slope is desirable, as any differences in lieft result in smarter changes in lie and loft. The above tables show that the Gradient Method always out performs the Constant Method in this regard. This is especially true when loft is held constant—see, e.g., the values in the lower left hand corner of Table 2. These numbers (e.g., 0.07 vs. 11.0) are so dramatic because changes in lie have very little effect on the lieft when loft is small and lie large. This illuminates a shortcoming of the Constant Method: there are areas in the application domain where changes in lieft are dominated by loft (or lie), and so holding this value constant causes dramatic overcompensation in the lie (or loft).

Similar considerations explain the extremely high value of 11.0 in the lieft versus lie Gradient Method in Table 2. Changes in the lieft are primarily caused by changes in the loft, which is also varied. Therefore, a better comparison may be between the vector magnitude of changes in the lie and loft. These values are reported in Table 3. Table 3 should be compared directly to the "lie" and "loft" labeled rows in Tables 1 and 2.

The Gradient Method can be taken a step further. As mentioned previously, the method initially assumed that changes in lie and loft with a small Euclidean norm are more probable than those with a larger norm. This allows the controller 200 to find a "most probable" solution. This is reasonable, but if the distribution of lie and lofts in a club set is known for all club manufacturers and models, the calculation results can be further improved. As another non-limiting example, the controller 200 may perform processing under these conditions under what is referred hereinafter as the Probability Method.

Consider the ideal case. In this situation, the controller 200 could determine (e.g., from storage in the memory 208) the exact two-dimensional probability density function (PDF) of lie and lofts for a given club. For example, if the controller 200 determines (e.g., from the face normal calibration) that a golfer is using a 6-iron, the controller 200 could input a particular lie and loft into this PDF, and the function would return the number of 6-irons with those lie and loft values, divided by the total number of 6-irons in use today. Therefore, higher values returned from this PDF function would indicate more probable configurations of lie and loft—ones a golfer is more likely to be using. If such a function could be derived, it could be substituted in place of the function 'f' in the Gradient Method derivation. Continuing on as before, the controller 200 could find the true "most probable" club.

Unfortunately, we are not able to obtain this ideal PDF function. Nevertheless, by using a simple approximation in the Probability Method, a significant improvement in accuracy can be achieved over the Gradient Method.

The Probability Method first assumes that the function 'f' is of the form (Equation 16):

$$f(\Delta\theta, \Delta\phi) = (\Delta\theta)^2 + \sigma^2(\Delta\phi)^2$$

The only difference in the above equation relative to the corresponding Gradient Method equation is the addition of a "stretch" factor ($\sigma$). Varying this stretch factor parameter from 1 causes the contours of constant probability to "stretch" from circles to ellipses. This is useful if the loft is more likely to vary than the lie, which is often true. Using this form for 'f' is equivalent to assuming the 2-dimensional PDF is a bivariate normal distribution with its two parameters—lie and loft—independent.

As in the Gradient Method, the changes in lie and loft can be solved for using the method of Lagrangian Multipliers, but now with the new function for 'f'. The full calculation is omitted for brevity, but the solution for the Probability Method is (Equation 17):

$$\Delta\theta = \Delta l \left( \frac{\sigma^2 \cos\theta_0 \sin\phi_0}{\cos^2\phi_0 \sin^2\theta_0 + \sigma^2 \cos^2\theta_0 \sin^2\phi_0} \right)$$

$$\Delta\phi = \Delta l \left( \frac{\cos\phi_0 \sin\theta_0}{\cos^2\phi_0 \sin^2\theta_0 + \sigma^2 \cos^2\theta_0 \sin^2\phi_0} \right)$$

where $\Delta l$ is cos(measured lieft)−cos(default club lieft).

Figure 9A:
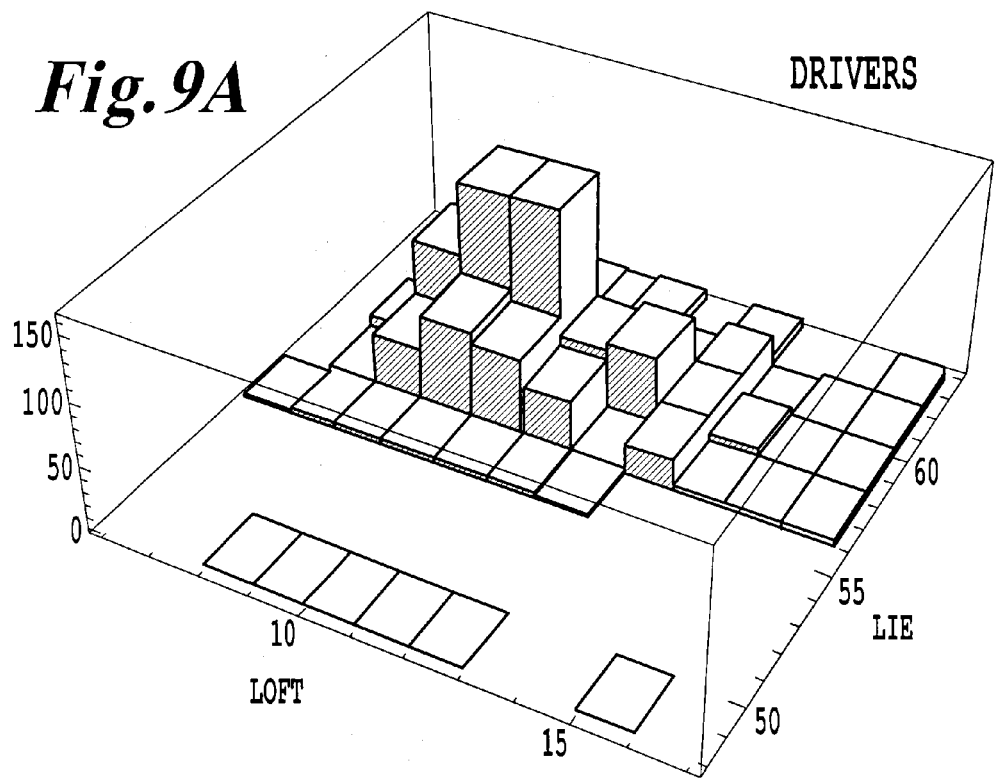
FIGS. 9A and 9B illustrate 3D histograms of lie versus loft values for a test set of golf clubs.
Figure 9B:
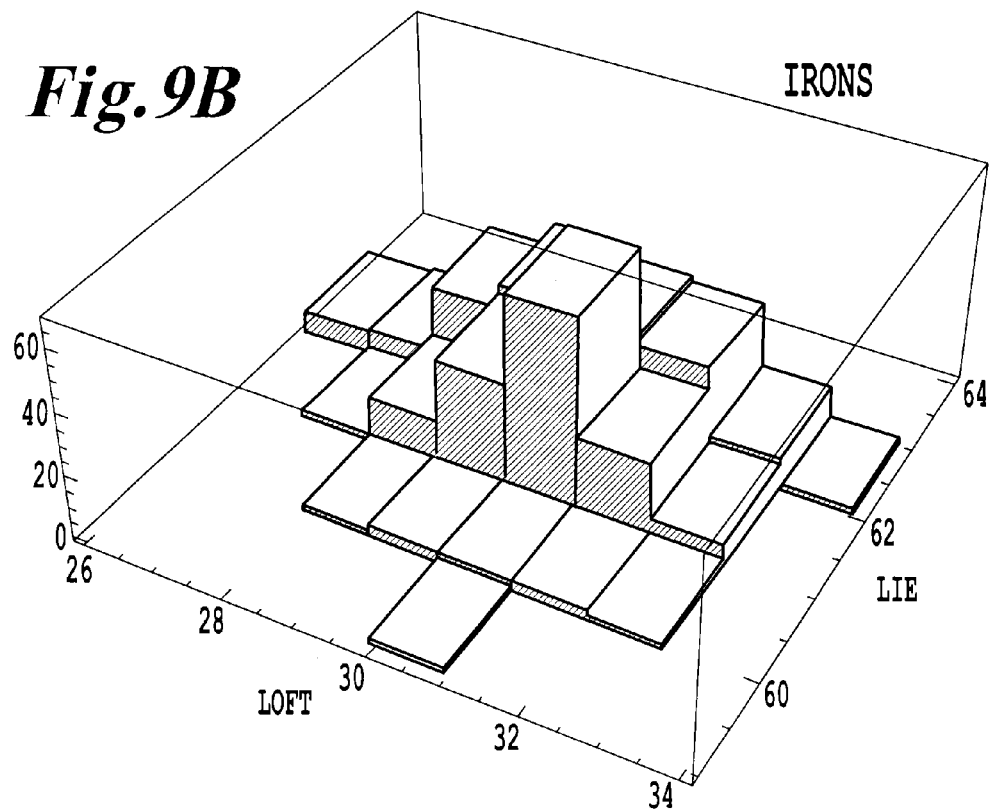

To test the Probability Method, club data for 6-irons and drivers was obtained from a SwingLabs (registered trademark) database. The test set included 1039 drivers and 319 6-irons. As shown in FIG. 9, plotting these clubs in a 3D histogram suggests the Probability Method form of 'f', and the associated bivariate normal distribution, is reasonable.

Satisfied that the Probability Method form of 'f' is a sensible approximation, we now turn to the determination of $\sigma$. Consider the ellipses of "equal probability," i.e., those contours of lie and loft for which 'f' returns a constant value. The $\sigma$ term quantifies the extent to which the ellipse is "stretched" in the loft direction. For example, a value of 2 indicates the axis of the ellipse in the loft direction is twice that in the lie direction, while a value of 0.5 indicates there is twice as much spread in lie as in loft. This leads to a simple strategy of visually approximating $\sigma$. Examining the 3D histograms of FIG. 9, we note that in the 6-iron case, there is roughly twice as much spread in loft (≈4° as in lie) (≈2°). Conversely, the spread in lie and loft is approximately equal for drivers. Thus, we estimate σ values as 2.0 and 1.0 for the 6-iron and driver ease, respectively.

Using these values for σ, a comparison calculated values of lie and loft to the true values was performed for each club in the test set. The procedure for the comparison was as follows.

First, each club's lieft was calculated exactly from its true lie and loft. This value imitates the result of the face normal calibration discussed previously (in the absence of measurement error). Next, the mean lie and loft was determined for all the test set clubs, and the mean lieft was calculated using these values. These parameters define the "default club." Using the mean values, and the Equation 17, the "most probable" change in lie and loft is determined from the default values to satisfy our faux measurement of lieft. Finally, error values (i.e., the difference between our calculated lie and loft for a particular club and its true values) were determined and compiled across all the clubs in the test set. The results for 6-irons is shown below in Table 4:

TABLE 4

Probability Method Test Results for 6-Iron

| Loft spread (°) | Loft Mean | Lie Mean | Loft Median | Lie Median | <1° Loft | <1° Lie | <1° Both |
|---|---|---|---|---|---|---|---|
| 0.5 | −0.0200397 | 0.0262553 | −0.064021 | 0.209359 | 0.974322 | 0.54232 | 0.54232 |
| 1.0 | −0.0162821 | 0.0139156 | −0.023998 | 0.0557572 | 1. | 0.793103 | 0.793103 |
| 2.0 | −0.0150228 | 0.00978169 | 0.0205105 | −0.0918277 | 1. | 0.9279 | 0.9279 |

In Table 4, "Loft Mean" refers to the mean of the error in the loft, and "<1° Both" is the percentage of clubs for which both lie and loft were calculated to within 1° of the true values. According to the latter metric, it's evident that a σ of 2.0 clearly outperforms both 0.5, and 1.0 (the Gradient Method).

In the driver case, the estimated value of σ=1.0 also outperforms the other two options, albeit not by as wide a margin:

TABLE 5

Probability Method Test Results for Driver

| Loft spread (°) | Loft Mean | Lie Mean | Loft Median | Lie median | <1° Loft | <1° Lie | <1° Both |
|---|---|---|---|---|---|---|---|
| 0.5 | −0.00508821 | −0.0149541 | 0.0223218 | −0.152514 | 0.995188 | 0.433109 | 0.433109 |
| 1.0 | −0.00496113 | −0.0160628 | −0.000662831 | −0.00289474 | 0.994225 | 0.525505 | 0.525505 |
| 2.0 | −0.00492783 | −0.0163584 | −0.0177539 | 0.148795 | 0.394225 | 0.514918 | 0.514918 |

It should be appreciated that the above-described Constant Method, Gradient Method, and Probability Method may be executed independently to determine a club's lie and/or loft. That is while varying degrees of accuracy may result the three methods are mutually exclusive and the present disclosure is not limiting in utilizing any particular method or combination of methods for determining lie and loft.

Figure 10:
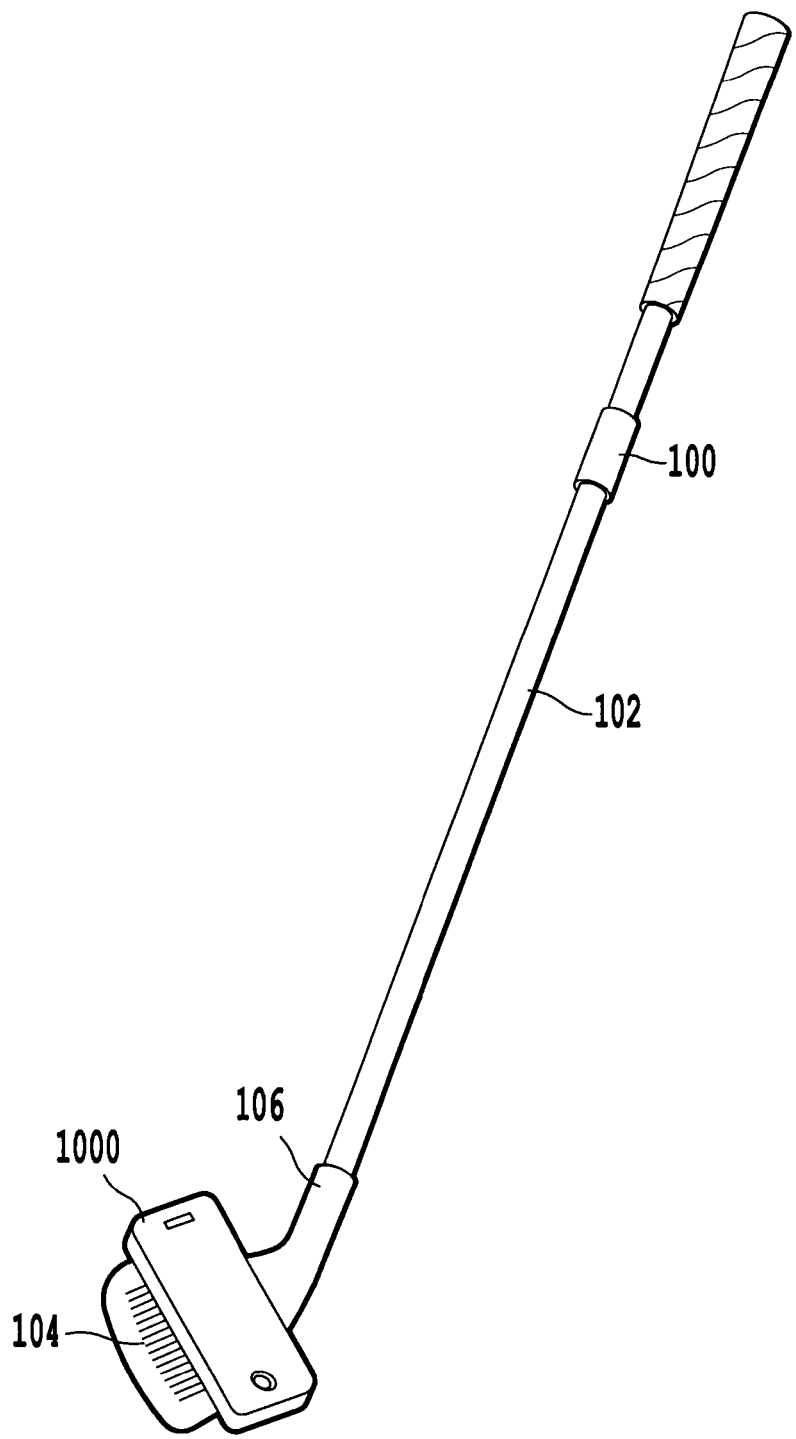
FIG. 10 illustrates the case of using a smartphone in an initial orientation calibration.

Next, FIG. 10 illustrates the case of performing any of the above-described processing via a sensor suite included in a smartphone. As discussed previously, the face IMU 101 may be a suite of sensors imbedded in another device, which can be temporarily affixed to the face 104 of the golf club 10 in order to perform an initial orientation calibration. As one can appreciate in light of the above discussions regarding calculating face normal, IMU separation distance, loft, etc., the processing described herein relies on generated motion to measure acceleration and the like of the respective IMUs.

The exemplary case of FIG. 10 includes the elements shown for the golf club 10 of FIG. 1A, but replaces the face IMU 101 with a smartphone 1000. The smartphone 1000 may be temporarily mounted to the face 104, or may be held in place by a user while the initial orientation calibration processing is performed. For example, a graphical interface displayed on the smartphone 1000 may include features to induce motion of the golf club 10 while the initial orientation calibration is performed and the various parameters in the above-described calculations are measured by the IMU sensors.

Figure 11A:
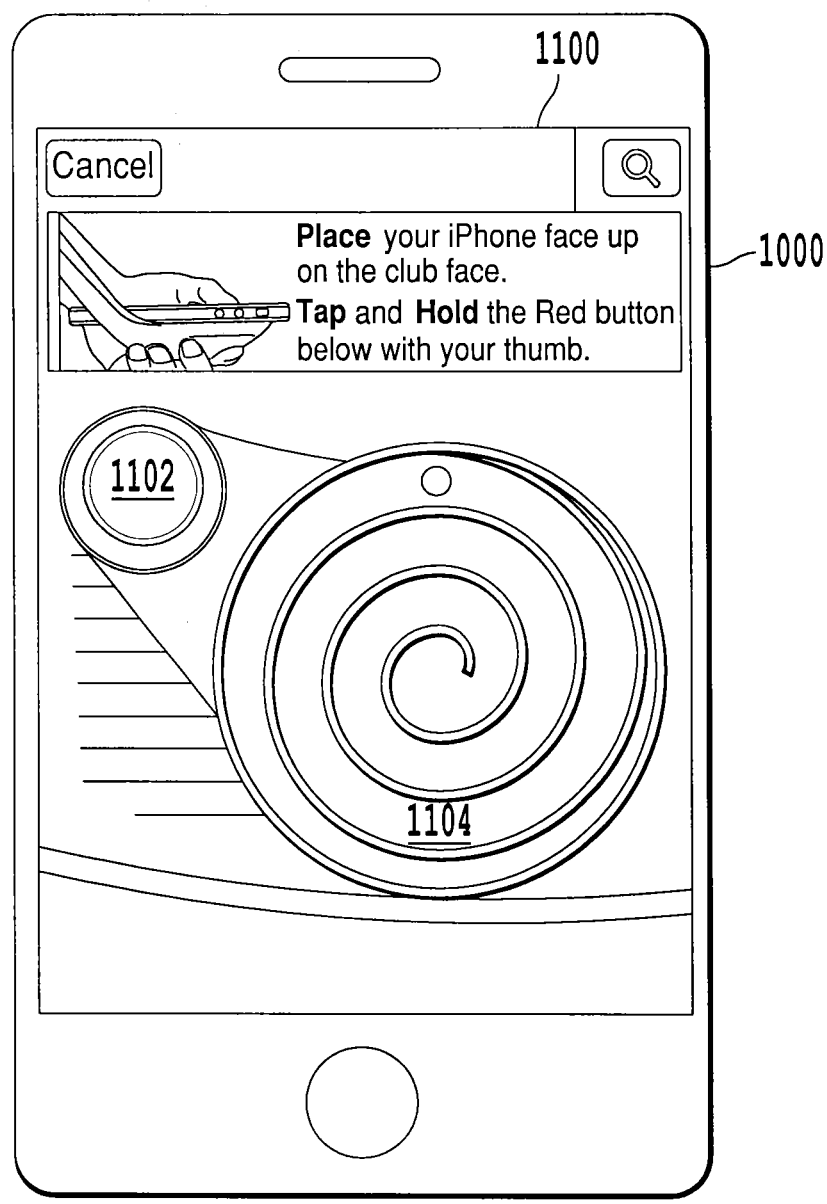
FIGS. 11A and 11B illustrate exemplary display interfaces for performing an initial orientation calibration.
Figure 11B:
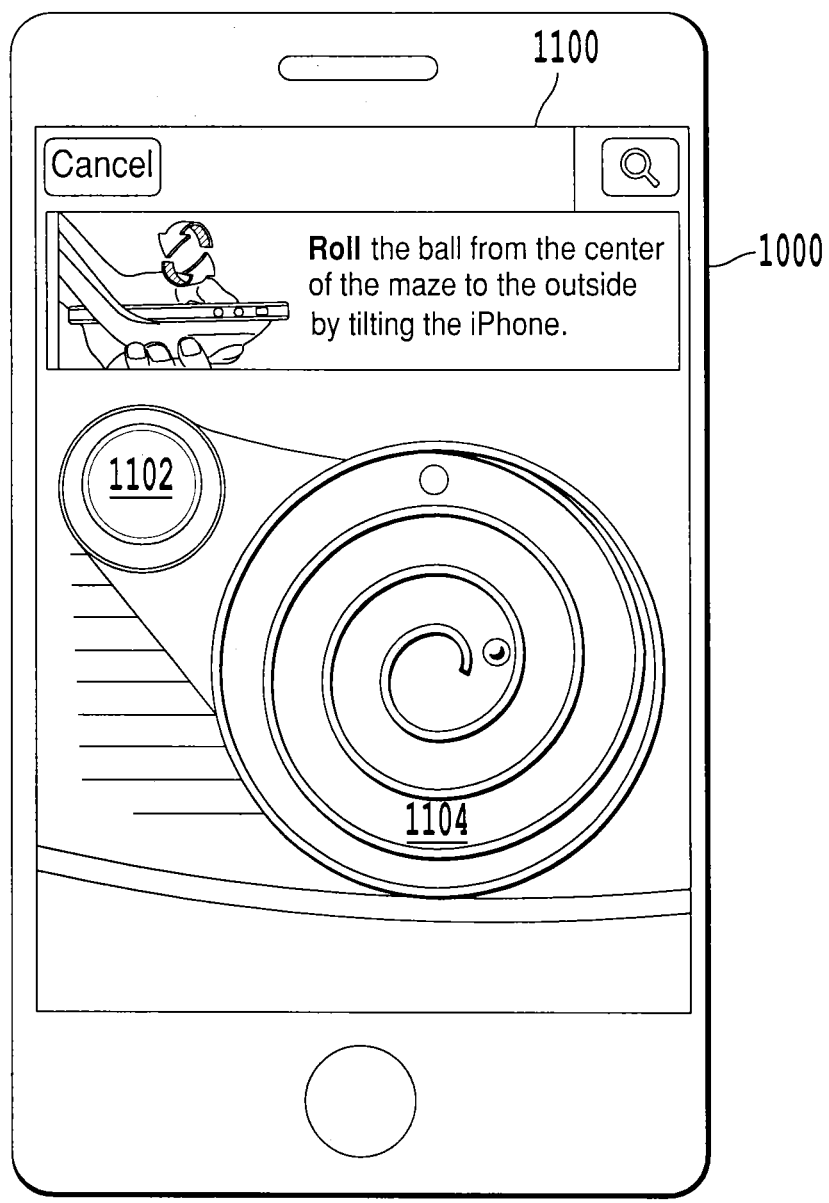

FIGS. 11A and 11B show a non-limiting example of a display 1100 on the smartphone 1000 that may be used to induce motion that is conducive to performing the above-described initial orientation calibration. Referring to FIG. 11, the display 1100 includes an input area 1102 that detects an input from a user. The input may correspond to detecting an input device (e.g., a finger, a stylus, etc.) contacting the display 1100 such that the smartphone 1000 is held in place while the golf club 10 is rotated. As a non-limiting example of these features, see the instruction on the display 1100 in FIG. 11A to "place your iPhone face up on the club face," and "tap and hold the red button below with your thumb." These instructions effectively orient and hold in place the smartphone 1000 sensors that may be utilized to perform the initial orientation calibration of the present disclosure.

The display 1100 also includes a maze 1104, which instructs the user to rotate the golf club 10 in such a way that the maze 1104 is completed, thereby generating the measured parameters (e.g., angular acceleration, angular velocity) used in the initial orientation calibration. As a non-limiting example, see the instruction on the display 1100 in FIG. 11B to "roll the ball from the center of the maze to the outside by tilting the iPhone."

It should be appreciated that while a smartphone interface with a maze display is used in FIGS. 10 and 11A-B to generate motion for performing an initial orientation calibration, the present disclosure is not limited to such devices and/or display features. To this end, any audio, visual, or written instruction may be used to induce motion within any sensor suite placed at any location on a rigid body (e.g., a golf club).

A number of implementations have been described. Nevertheless, it will be understood that various modifications may be made without departing from the spirit and scope of this disclosure. For example, advantageous results may be achieved if the steps of the disclosed techniques were performed in a different sequence, if components in the disclosed systems were combined in a different manner, or if the components were replaced or supplemented by other components. The functions, processes and algorithms described herein may be performed in hardware or software executed by hardware, including computer processors and/or programmable circuits configured to execute program code and/or computer instructions to execute the functions, processes and algorithms described herein. Additionally, some implementations may be performed on modules or hardware not identical to those described. Accordingly, other implementations are within the scope that may be claimed.

It must be noted that, as used in the specification and the appended claims, the singular forms "a," "an," and "the" include plural referents unless the context clearly dictates otherwise.

The invention claimed is:

1. An apparatus comprising:
a first sensor that measures a first angular velocity;
a communications interface that receives a measurement signal, the measurement signal including a second angular velocity transmitted from another apparatus including a second sensor; and
a controller including circuitry, the circuitry configured to calculate a rotation vector that aligns the first angular velocity with the second angular velocity on an inertial frame,
wherein the first angular velocity and the second angular velocity are generated in response to a movement of a golf club when the apparatus and the another apparatus are in contact with the golf club, and
wherein the circuitry is further configured to determine a classification of the golf club based on the calculated rotation vector.

2. The apparatus of claim 1, wherein the another apparatus is in contact with a planar surface of the golf club, and the calculated rotation vector is normal to the planar surface.

3. The apparatus of claim 1, wherein the calculated rotation vector corresponds to a normal direction of the golf club face.

4. The apparatus of claim 1, wherein the first sensor measures the first angular velocity periodically across a first predetermined time period, the communications interface receives a second time series including measurements of the second angular velocity by the second sensor periodically across a second predetermined time period.

5. The apparatus of claim 4, wherein in response to receiving the second time series, the circuitry is configured to synchronize a first time series and the second time series.

6. The apparatus of claim 5, wherein the circuitry is configured to synchronize the first time series and the second time series by cross correlating magnitudes of the first angular velocity and the second angular velocity in the respective time series, and determine a highest cross-correlation value.

7. The apparatus of claim 4, wherein the circuitry is configured to determine a slipping error by comparing the second angular velocities included in the second time series, and identify adjacent second angular velocities that differ by a predetermined magnitude.

8. The apparatus of claim 4, wherein the circuitry is configured to calculate the rotation vector by calculating a symmetric matrix using a first time series and the second time series, and determine a normalized eigenvector associated with a largest eigenvalue, the normalized eigenvector determination being based on eigenvector analysis performed on the symmetric matrix.

9. The apparatus of claim 1, wherein the second sensor is included as a sensor in a smartphone.

10. The apparatus of claim 3, wherein the circuitry is configured to calculate a lieft angle based on the calculated face normal, the lieft angle being an angle formed by the face normal and a shaft of the golf club.

11. The apparatus of claim 10, further comprising a list of reference club information that includes a plurality of reference lieft angles, and the circuitry is configured to determine the classification of the golf club by matching the calculated lieft angle to one or more clubs included in the list of reference club information.

12. The apparatus of claim 10, wherein the circuitry is configured to determine a default loft angle for the golf club based on the calculated lieft angle.

13. The apparatus of claim 12, wherein the circuitry is configured to calculate a lie angle for the golf club based on the default loft angle and the calculated lieft angle.

14. The apparatus of claim 10, wherein the circuitry is configured to determine a default lie angle for the golf club based on the calculated lieft angle.

15. The apparatus of claim 14, wherein the circuitry is configured to calculate a loft angle for the golf club based on the default lie angle and the calculated lieft angle.

16. The apparatus of claim 1, wherein the circuitry is configured to calculate the rotation vector using a fitting algorithm.

17. An apparatus comprising:
a first sensor that measures an angular velocity and an angular acceleration;
a second sensor that measures a first acceleration;
a communications interface that receives a measurement signal, the measurement signal including a second acceleration transmitted from another apparatus including a third sensor; and
a controller including circuitry, the circuitry configured to calculate a rotation vector that aligns the first acceleration with the second acceleration on an inertial frame,
wherein the first acceleration, the second acceleration, and the angular acceleration are generated in response to a movement of a golf club when the first sensor, the second sensor, and the third sensor are in contact with the golf club, and
wherein the circuitry determines a classification of the golf club based on the calculated rotation vector.

18. The apparatus of claim 17, wherein the circuitry is configured to calculates a distance separating the second sensor and the third sensor based on the first acceleration, the second acceleration, the angular velocity, and the angular acceleration.

19. The apparatus of claim 17, wherein the another apparatus including the third sensor, is in contact with a planar surface of the golf club, and the calculated rotation vector is normal to the planar surface.

20. The apparatus of claim 17, wherein the calculated rotation vector corresponds to a normal of the golf club face.

21. The apparatus of claim 18, wherein the circuitry is configured to calculate the rotation vector and the distance separating the second sensor and the third sensor using a fitting algorithm.

22. The apparatus of claim 20, wherein the circuitry is configured to calculate a lieft angle based on the calculated face normal, the lieft angle being an angle formed by the face normal and a shaft of the golf club.

23. The apparatus of claim 22, further comprising a list of reference club information that includes a plurality of reference lieft angles, and the circuitry is configured to determine the classification of the golf club by matching the calculated lieft angle to one or more clubs included in the list of reference club information.

24. The apparatus of claim 22, wherein the circuitry is configured to determine a default loft angle for the golf club based on the calculated lieft angle.

25. The apparatus of claim 24, wherein the circuitry is configured to calculate a lie angle for the golf club based on the default loft angle and the calculated lieft angle.

26. The apparatus of claim 22, wherein the circuitry is configured to determine a default lie angle for the golf club based on the calculated lieft angle.

27. The apparatus of claim 26, wherein the circuitry is configured to calculate a loft angle for the golf club based on the default lie angle and the calculated lieft angle.

28. A method comprising:
measuring, by a first sensor, a first angular velocity of a golf club;
receiving, by a communications interface, a measurement signal, the measurement signal including a second angular velocity transmitted from a device including a second sensor; and
calculating, by a controller that includes circuitry, a rotation vector that aligns the first angular velocity with the second angular velocity on an inertial frame,
wherein the circuitry is configured to determine a classification of the golf club based on the calculated rotation vector.

29. A method comprising:
measuring, by a first sensor, an angular velocity and an angular acceleration of a golf club;
measuring, by a second sensor, a first acceleration of the golf club;
receiving, by a communications interface, a measurement signal, the measurement signal including a second acceleration transmitted from a device including a third sensor; and
calculating, by a controller that includes circuitry, a rotation vector that aligns the first acceleration with the second acceleration on an inertial frame, wherein the circuitry is configured to determine a classification of the golf club based on the calculated rotation vector.

30. An inertial measurement unit in contact with a first point on a golf club, the inertial measurement unit comprising:
a gyroscope that measures an angular velocity and an angular acceleration of the golf club;
a first accelerometer that measures a first acceleration of the golf club;
a communications interface that receives a measurement signal, the measurement signal including a second acceleration transmitted from a second accelerometer, the second accelerometer being in contact with a second point of the golf club; and
a controller that includes circuitry, the circuitry configured to calculate, based on the angular velocity, the angular acceleration, the first acceleration, and the second acceleration, a relative orientation of the inertial measurement unit and the second accelerometer, and a distance separating the inertial measurement unit and the second accelerometer,
wherein the circuitry is configured to determine a classification of the golf club based on a calculated rotation vector.

* * * * *